United States Patent
Judd et al.

(10) Patent No.: US 10,263,933 B2
(45) Date of Patent: Apr. 16, 2019

(54) INCORPORATING SELECTABLE APPLICATION LINKS INTO MESSAGE EXCHANGE THREADS

(71) Applicant: Google Inc., Mountain View, CA (US)

(72) Inventors: Tilke Judd, Zürich (CH); Yariv Adan, Cham (CH); Zaheed Sabur, Adliswil (CH); Behshad Behzadi, Freienbach (CH); Lucas Mirelmann, Zürich (CH); Jan Lamecki, Zürich (CH); Dhruv Bakshi, Zürich (CH)

(73) Assignee: GOOGLE LLC, Mountain View, CA (US)

( * ) Notice: Subject to any disclaimer, the term of this patent is extended or adjusted under 35 U.S.C. 154(b) by 195 days.

(21) Appl. No.: 15/157,279

(22) Filed: May 17, 2016

(65) Prior Publication Data

US 2017/0339085 A1   Nov. 23, 2017

(51) Int. Cl.
*H04L 12/58* (2006.01)
*H04L 29/08* (2006.01)
(Continued)

(52) U.S. Cl.
CPC ............ *H04L 51/18* (2013.01); *G06F 3/0482* (2013.01); *G06F 17/2235* (2013.01);
(Continued)

(58) Field of Classification Search
CPC ....... H04L 51/046; H04L 51/16; H04L 51/18; H04L 67/02; H04L 67/32
(Continued)

(56) References Cited

U.S. PATENT DOCUMENTS

| 6,976,082 B1 | 12/2005 | Ostermann et al. |
| 7,424,516 B2 | 9/2008 | Leeds |

(Continued)

FOREIGN PATENT DOCUMENTS

| AU | 2012201460 | 9/2013 |
| GB | 2470751 | 12/2010 |

(Continued)

OTHER PUBLICATIONS

The Intellectual Property Office of the United Kingdom; Combined Search and Examination Report under Sections 17 and 18(3) of Application No. GB1621385.2 dated Mar. 17, 2017.
(Continued)

*Primary Examiner* — Ruolei Zong
(74) *Attorney, Agent, or Firm* — Middleton Reutlinger

(57) ABSTRACT

Methods, apparatus, systems, and computer-readable media are provided for incorporating application links into message exchange threads. One or more cues emanating from a message exchange thread involving two or more message exchange clients may be detected. The one or more cues may trigger incorporation, into the message exchange thread, of a selectable link to a distinct application. At least one candidate application that is installed on a given client computing device operated by a message exchange thread participant may be identified. The candidate application may be associated with content of the message exchange thread. A selectable link may be incorporated into a transcript of the message exchange thread displayed in a graphical user interface of a message exchange client operating on the given client computing device. The selectable link may be operable by the participant to expose to the participant an interface associated with a respective candidate application.

19 Claims, 7 Drawing Sheets

(51) Int. Cl.
| | |
|---|---|
| *G06Q 10/10* | (2012.01) |
| *G06F 17/22* | (2006.01) |
| *G06F 17/30* | (2006.01) |
| *G06F 3/0482* | (2013.01) |
| *G06F 17/24* | (2006.01) |
| *H04W 4/02* | (2018.01) |
| *H04W 4/12* | (2009.01) |

(52) U.S. Cl.
CPC ...... *G06F 17/248* (2013.01); *G06F 17/30014* (2013.01); *G06F 17/30876* (2013.01); *G06Q 10/10* (2013.01); *H04L 51/16* (2013.01); *H04L 67/02* (2013.01); *H04L 67/34* (2013.01); *H04W 4/02* (2013.01); *H04W 4/12* (2013.01)

(58) Field of Classification Search
USPC .......................................................... 709/206
See application file for complete search history.

(56) References Cited

U.S. PATENT DOCUMENTS

| | | | |
|---|---|---|---|
| 9,031,216 B1 | 5/2015 | Kamvar et al. | |
| 9,253,137 B1 | 2/2016 | Jackson et al. | |
| 2003/0101413 A1 | 5/2003 | Klein et al. | |
| 2004/0215467 A1 | 10/2004 | Coffman et al. | |
| 2005/0125504 A1 | 6/2005 | Leeds | |
| 2006/0155785 A1 | 7/2006 | Berry et al. | |
| 2006/0167992 A1 | 7/2006 | Cheung et al. | |
| 2008/0201434 A1 | 8/2008 | Holmes et al. | |
| 2009/0112782 A1 | 4/2009 | Cross et al. | |
| 2009/0125477 A1 | 5/2009 | Lu et al. | |
| 2011/0035453 A1 | 2/2011 | Koul et al. | |
| 2012/0016678 A1* | 1/2012 | Gruber | G06F 17/3087 704/275 |
| 2012/0284093 A1 | 11/2012 | Evans | |
| 2013/0152092 A1 | 6/2013 | Yadgar | |
| 2013/0218885 A1 | 8/2013 | Satyanarayanan | |
| 2013/0297317 A1 | 11/2013 | Lee et al. | |
| 2013/0326354 A1 | 12/2013 | Anderson | |
| 2014/0204173 A1 | 7/2014 | Eidelson et al. | |
| 2014/0244243 A1 | 8/2014 | Kim et al. | |
| 2014/0297283 A1 | 10/2014 | Hebert et al. | |
| 2014/0365885 A1 | 12/2014 | Carson et al. | |
| 2015/0199967 A1* | 7/2015 | Reddy | G10L 25/30 704/249 |
| 2015/0350123 A1 | 12/2015 | Park et al. | |
| 2016/0055246 A1 | 2/2016 | Marcin et al. | |
| 2017/0026318 A1* | 1/2017 | Daniel | H04L 51/046 |
| 2017/0295122 A1* | 10/2017 | Pfriem | H04L 51/04 |

FOREIGN PATENT DOCUMENTS

| | | |
|---|---|---|
| WO | 2011088053 | 7/2011 |
| WO | 2016187149 | 11/2016 |
| WO | WO2017112786 A1 | 6/2017 |
| WO | WO2017112796 A1 | 6/2017 |

OTHER PUBLICATIONS

International Search Report and Written Opinion of PCT Ser. No. PCT/US16/68332 dated Apr. 21, 2017.
German Patent and Trademark Office, Office Action for German Application No. 102016125509.2, 14 pages, dated Oct. 10, 2017.
Armentano, Marcelo G., and Analía A. Amandi. "A framework for attaching personal assistants to existing applications." Computer Languages, Systems & Structures 35.4 (2009): 448-463.
Marcus, Adam; Michael S. Bernstein, Osama Badar, David R. Karger, Samuel Madden, and Robert C. Miller. "Twitinfo: aggregating and visualizing microblogs for event exploration." In Proceedings of the SIGCHI conference on Human factors in computing systems, pp. 227-236. ACM, 2011.

* cited by examiner

INCORPORATING SELECTABLE APPLICATION LINKS INTO MESSAGE EXCHANGE THREADS

BACKGROUND

Multiple users may communicate with each other textually via message exchange threads that may be implemented using various technologies, such as text messaging, online chat (e.g., instant messenger, Internet relay chat, etc.), social network messaging, and so forth. Message exchange client applications (or "apps") such as text messaging apps, online chat apps, social networking apps, etc., may display at least part of a transcript (e.g., a live or near live record of text and/or images that is updated in real time as the users converse) of an ongoing message exchange thread as part of a graphical user interface, so that users can follow the conversation. The ongoing message exchange thread, and hence, the displayed transcript, is typically limited to text or other data such as pictures that users deliberately and explicitly incorporate into the message exchange thread. Consequently, users seeking to perform various actions in response to various events of the conversation, such as making a reservation or consulting a map, must switch to a different application in order to do so. Manually switching applications, e.g., by minimizing the message exchange client to locate and open a desired application and then populate one or more data fields, may be burdensome and may disrupt the flow of the conversation.

SUMMARY

The present disclosure is generally directed to methods, apparatus, and computer-readable media (transitory and non-transitory) for incorporating "selectable application links"—graphical elements operable by a participant in a message exchange thread to expose the participant to an interface associated with another application—directly into a transcript of the message exchange thread that is rendered on one or more message exchange clients. In various implementations, the selectable application links that are incorporated into a transcript may be dictated by resources of the client device that renders the transcript as part of a message exchange client. For instance, one or more "candidate applications" that are somehow relevant to the content of the message exchange thread—and that are also installed on a given client computing device operated by a participant in the message exchange thread—may be identified. In some implementations, only selectable application links to installed applications may be presented (unless no applicable applications are installed, in which case a link to an application installer or web page having corresponding functionality to a non-installed app may be included instead).

Incorporation of selectable application links into a transcript may be triggered by various cues. In some implementations, the cues may emanate from content of the message exchange thread. For example, one participant may ask, "where should we eat tonight?" Another participant may respond with a specific restaurant suggestion. Such an exchange may trigger insertion of one or more selectable application links associated with the restaurant (e.g., a link to a maps app showing the location, a link to a reservations app to make a reservation, etc.). Additionally or alternatively, the mere mention of an entity may trigger a search of a knowledge base of known entities (e.g., people, places, things) and relationships therebetween to identify a known entity, and if a known entity is identified, inserting a selectable application link to an application relevant to that entity (e.g., restaurant would trigger reservation app, musician would trigger music app, etc.). As another example, one or more keywords or key phrases may be associated with one or more applications, such that if the keyword or phrase is detected in the message exchange thread, a selectable application link to that application is inserted. As yet another example, a participant may explicitly request insertion of selectable application links into the transcript, e.g., by summoning a so-called personal assistant module or "bot" to insert links (e.g., "[BOT], let's make a reservation at XYZ").

Applications installed on a client device may be identified in various ways. In some implementations, applications installed on the client device may be known remotely from the client device, e.g., by an application store server that has a record of applications installed on one or more client devices forming an "ecosystem" of devices operated by a participant. In such case, data indicative of one or more selectable application links associated with applications known to be installed on a client device may be downloaded to the client device so that the client device can incorporate a selectable application link to those applications into a message thread. In some implementations, multiple installed applications may be identified remotely (and data indicative thereof downloaded to the client), and then the client device may select a subset of the multiple applications based on various signals, such as frequency of use of the application (e.g., among one or more client computing devices of the participant's ecosystem, or on a single client computing device). In some implementations, the client device itself may identify installed applications. For example, an application "category" (e.g., "maps," "reservations," "music," "film," "messaging," "videoconferencing," "telephone," etc.) may be identified based on content of a message exchange thread, and then a client device may identify within the category what, if any, matching applications it has installed.

In some implementations, a computer implemented method may be provided that includes the following operations: detecting one or more cues emanating from a message exchange thread involving two or more message exchange clients, wherein the one or more cues trigger incorporation, into the message exchange thread, of one or more selectable links to one or more applications distinct from the message exchange thread; identifying one or more candidate applications that are installed on a given client computing device operated by a participant in the message exchange thread, wherein the one or more candidate applications are associated with content of the message exchange thread; and incorporating, into a transcript of the message exchange thread that is displayed in a graphical user interface of a message exchange client operating on the given client computing device, one or more selectable links, wherein each selectable link is operable by the participant to cause the given client computing device to expose to the participant an interface associated with a respective candidate application.

This method and other implementations of technology disclosed herein may each optionally include one or more of the following features.

In various implementations, the identifying may be performed remotely from the given client computing device, and data indicative of the one or more selectable links may be downloaded to the given client device. In various implementations, the method may further include selecting, by the given client device, a subset of the downloaded one or more selectable links for display based on one or more information signals. In various implementations, the one or more information signals may include a frequency of use of the one or more candidate applications. In other implementations, the identifying may be performed by one or more processors that is integral with the given client computing device itself.

In various implementations, the one or more cues may emanate from the content of the message exchange thread. In various implementations, the one or more cues may include a keyword or phrase associated with a particular application. In various implementations, the one or more cues may include a statement directed from one participant of the message exchange thread to another participant that matches a pattern associated with a particular application. In various implementations, the one or more cues may include a match between the statement and a template associated with the particular application. In some implementations, the template may be generated from a corpus of messages that includes messages from prior message exchange threads. In some implementations, the template may be associated with a cluster of messages from the corpus that share one or more attributes.

In various implementations, the identifying may include identifying, as a candidate application, a web browser installed on the given client computing device in response to a determination that a given application associated with content of the message exchange thread is not installed on the given client computing device. In various implementations, the incorporating may include incorporating, into the transcript, a selectable link to an interactive webpage, wherein the interactive webpage includes functionality that corresponds to functionality of the given application that is not installed on the given client computing device. In other implementations, the incorporating may include incorporating, into the transcript, a selectable link to a webpage associated with downloading an installer of the given application.

In various implementations, the method may further include determining a context of one or more participants in the message exchange thread, and prepopulating one or more data points associated with at least one of the one or more candidate applications based on the determined context. In various implementations, determining the context may include obtaining, from one or more of the client devices, one or more contextual signals. In various implementations, the one or more contextual signals may include a location of at least one participant in the message exchange thread. In various implementations, determining the context may include analyzing content of the message exchange thread to determine one or more attributes of at least one of the participants.

In various implementations, the method may further include identifying an application category associated with the one or more cues. In various implementations, the one or more candidate applications may include a candidate application that is associated with the application category and also is installed on the given client computing device. In various implementations, the one or more cues may include mention of an entity. In various implementations, the method may further include matching the mentioned entity with one or more known entities in a knowledge base of entities and relationships therebetween.

Other implementations may include a non-transitory computer readable storage medium storing instructions executable by a processor to perform a method such as one or more of the methods described above. Yet another implementation may include a system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
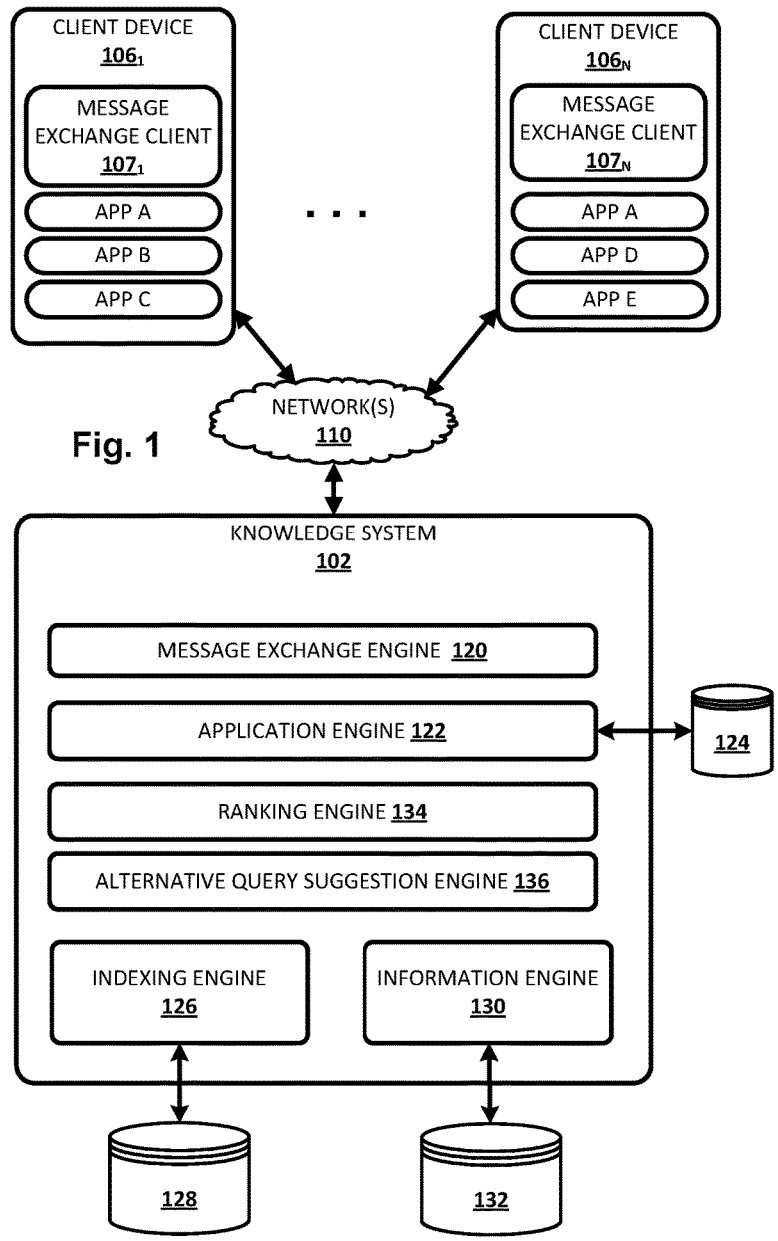
FIG. 1 illustrates an environment in which one or more selectable application links may be incorporated into a message exchange thread, in accordance with various implementations.

FIG. 1 illustrates an environment in which one or more selectable application links may be incorporated into a message exchange thread. The example environment includes a plurality of client devices $106_{1-N}$ and a knowledge system 102. Knowledge system 102 may be implemented in one or more computers that communicate, for example, through a network. Knowledge system 102 is an example of an information retrieval system in which the systems, components, and techniques described herein may be implemented and/or with which systems, components, and techniques described herein may interface.

A user may interact with knowledge system 102 via one or more client devices 106. Each client device 106 may be a computer coupled to the knowledge system 102 through one or more networks 110 such as a local area network (LAN) or wide area network (WAN) such as the Internet. Each client device 106 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device). Additional and/or alternative client devices may be provided. In many instances, a participant (i.e. an individual user) in a message exchange thread likely operates/owns a plurality of client devices 106 that collectively form a coordinated "ecosystem" of client devices.

Each client device 106 may operate a variety of different applications, such as a message exchange client 107, and/or the applications APP A, APP B, APP C, APP D, and APP E depicted in FIG. 1. It can be seen that different hypothetical applications are installed on different client devices 106. For example, first client device $106_1$ has APP A, APP B, and APP C installed. Another client device $106_N$ also has APP A installed, but does not have APP B or APP C installed. However, the other client device $106_N$ has APP D and APP E installed. APPs A-E are meant to generically refer to any application that can have an interface exposed to a user of the client device 106 in response to various events. An application interface may be "exposed" to a user (i.e. allow the user to interact with it) by loading/opening/launching the application (e.g., from non-volatile memory), or, if the application is already initiated/opened/launched in the background, bringing the application to the foreground (e.g., making the application window the active window). These apps (and any "candidate application" mentioned herein) can include but are not limited to applications for making reservations (e.g., restaurant reservations, hotel reservations, airline reservations, train reservations, event reservations, etc.), map applications, calendar applications, reminder applications, media consumption applications (e.g., music or video players), games, messaging apps, weather apps, real estate apps, health tracking apps, shopping apps, news apps, ride sharing apps, productivity applications such as word processors or spreadsheet applications, telephone applications, web browsers, and so forth.

Message exchange client 107 may come in various forms. In some implementations, message exchange client 107 may come in the form of a short messaging service ("SMS") and/or multimedia messaging service ("MMS") client, an online chat client (e.g., instant messenger, Internet relay chat, or "IRC," etc.), a messaging application associated with a social network, an interface for conversing with a personal assistant module operating on a client device, and so forth. In some implementations, message exchange client 107 may be implemented within a webpage rendered by a web browser (not depicted). In various instances, two client devices operated by participants of a message exchange thread may run different message exchange clients 107 that nonetheless facilitate communication using a common communication protocol. For example, client device $106_1$ may have one SMS application distributed by one vendor installed, and client device $106_N$ may have another SMS application distributed by another vendor installed.

Each client device 106 and knowledge system 102 may include one or more memories for storage of data and software applications, one or more processors for accessing data and executing applications, and other components that facilitate communication over a network. The operations performed by one or more client devices 106 and/or knowledge system 102 may be distributed across multiple computer systems. Knowledge system 102 may be implemented as, for example, computer programs running on one or more computers in one or more locations that are coupled to each other through a network.

In various implementations, knowledge system 102 may include a message exchange engine 120, an application engine 122, an indexing engine 126, an information engine 130, a ranking engine 134, and an alternative query suggestion engine 136. In some implementations one or more of engines 120, 122, 126, 130, 134, and/or 136 may be omitted.

In some implementations all or aspects of one or more of engines 120, 122, 126, 130, 134, and/or 136 may be combined. In some implementations, one or more of engines 120, 122, 126, 130, 134, and/or 136 may be implemented in a component that is separate from knowledge system 102. In some implementations, one or more of engines 120, 122, 126, 130, 134, and/or 136, or any operative portion thereof, may be implemented in a component that is executed by client device 106.

Application engine 122 may maintain an index 124 of applications installed or otherwise available to client devices 106. For example, application engine 122 may be integral with, or at least in communication with, a so-called "app store" from which users of client devices 106 download applications (or "apps"). In some implementations, when a user downloads and/or installs an app from application engine 122 (or from an app store in communication with application engine 122), a record may be added, e.g., in index 124, that the user has that application installed. In some implementations, these records may be periodically synchronized with client devices 106 to reflect, for instance, when users uninstall apps, when users download and install apps from sources other than an app store available to application engine 122, and so forth. As will be described below, application engine 122 is one of multiple components depicted in FIG. 1 that can participate in the process of identifying applications that are installed on client devices 106, so that suitable selectable application links may be inserted into transcripts of message exchange threads rendered in message exchange clients 107 operating on those client devices 106.

In some implementations, application engine 122 may be accessible by individual users through accounts the users set up. For example, a user may have an account with application engine 122 (or with an app store in communication with application engine 122) that the user can access using various credentials (e.g., username/password, retinal scan, fingerprint scan, etc.). Once the user is signed in to her account, she may download one or more apps to one or more client devices forming an ecosystem of client devices operated/owned by the user. In some instances, particular apps may only be available for download on the condition that the user purchase the app (or rights to use the app). In some implementations, when a user purchases an app, the user thereafter may have the right to download and install the app on multiple client devices 106 of an ecosystem of client devices 106 operated/owned by the user.

In various implementations, message exchange engine 120 may be configured to facilitate a message exchange thread between multiple message exchange clients 107 operating on multiple client devices 106 controlled by multiple participants. For example, message exchange engine 120 may maintain a global "transcript" of messages and other content participants exchange with each other in a message exchange thread. As used herein, a "transcript" may refer to a live record of text, images, sounds, and/or applets exchanged and/or viewed by one or more participants in a message exchange thread. In some implementations, a transcript of a message exchange thread may be updated in real time or near real time as the participants converse.

Indexing engine 126 may maintain an index 128 for use by knowledge system 102. The indexing engine 126 processes documents and updates index entries in the index 128, for example, using conventional and/or other indexing techniques. For example, the indexing engine 126 may crawl one or more resources such as the World Wide Web and index documents accessed via such crawling. As another example, the indexing engine 126 may receive information related to one or documents from one or more resources such as web masters controlling such documents and index the documents based on such information. A document is any data that is associated with a document address. Documents include web pages, word processing documents, portable document format (PDF) documents, images, emails, calendar entries, videos, and web feeds, to name just a few. Each document may include content such as, for example: text, images, videos, sounds, embedded information (e.g., meta information and/or hyperlinks); and/or embedded instructions (e.g., ECMAScript implementations such as JavaScript).

Information engine 130 may maintain another index 132 that includes or facilitates access to non-document-specific information for use by the knowledge system 102. For example, knowledge system 102 may be configured to return information in response to search queries that appear to seek specific information. If a user searches for "Ronald Reagan's birthday," knowledge system 102 may receive, e.g., from information engine 130, the date, "Feb. 6, 1911." This information may be returned to the user as a part of search results that is separate from documents received from indexing engine 126. In various implementations, index 132 itself may contain information, or it may link to one or more other sources of information, such as online encyclopedias, almanacs, and so forth. In various implementations, index 128 or index 132 may include mappings between queries (or query terms) and documents and/or information.

In this specification, the term "database" and "index" will be used broadly to refer to any collection of data. The data of the database and/or the index does not need to be structured in any particular way and it can be stored on storage devices in one or more geographic locations. Thus, for example, the indices 124, 128, and 132 may include multiple collections of data, each of which may be organized and accessed differently.

Ranking engine 134 may use the indices 128 and/or 132 to identify documents and other information responsive to a search query, for example, using conventional and/or other information retrieval techniques. Ranking engine 134 may calculate scores for the documents and other information identified as responsive to a search query, for example, using one or more ranking signals. Each ranking signal may provide information about the document or information itself, the relationship between the document or information and the search query, and/or the relationship between the document or information and the user performing the search.

Alternative query suggestion engine 136 may use one or more signals and/or other information, such as a database of alternative query suggestions (not depicted) and/or information about a user of client device 106 (e.g., search history, GPS location, user attributes), to generate alternative query suggestions to provide to client device 106 along with any search results. As a user types consecutive characters of the search query, alternative query suggestion engine 136 may identify alternative queries that may be likely to yield results that are useful to the user. For instance, assume the client device 106 is located in Chicago, and has typed the characters, "restaur." Alternative query suggestion engine 136 may, based on a location signal indicating that the client device 106 is in Chicago and a search history signal indicating a user's preference for restaurants with live music, suggest a query, "restaurants in Chicago with live music." As another example, for a user who has typed "Ronald Reagan's birt," alternative query suggestion engine 136 may, e.g., using techniques such as prefix matching, determine and suggest alternative queries such as "Ronald Reagan's birthday," "Ronald Reagan's birthplace," "Ronald Reagan's birth control position," and so forth. Alternative query suggestion engine 136 may provide other suggestions as well, such as spelling-corrected versions of a partially-formed search query.

In various implementations, one or more message exchange clients 107 and/or message exchange engine 120 may be configured to detect one or more cues emanating from a message exchange thread involving two or more message exchange clients 107. In various implementations, the one or more cues may trigger incorporation of one or more selectable links into the message exchange thread. Each of the one or more selectable applications links may link to an application that is distinct from the message exchange thread.

In some implementations, the cues may emanate from content of the message exchange thread. For example, one or more participants mentioning an entity or keyword/key phrase associated with one or more applications may constitute a cue to incorporate one or more selectable application links to the one or more applications into the message exchange thread. Another example of a cue is a statement directed by one or more participants to another that matches a pattern or template associated with an application. In various implementations, the template may be associated with a particular application. For instance, the template may have been generated from a corpus of messages that includes messages from prior message exchange threads that lead to user invocation or activation of a particular application. In some implementations, the template may be associated with a cluster of messages from a corpus that share one or more attributes, such as the messages including the same or similar fixed and "transient" text. In yet other implementations, cues may be more explicit. For example, a user could input a message into the thread that is directed at her personal assistant module, e.g., "Hey BOT, what's the weather in San Francisco?" This may prompt the personal assistant module to incorporate one or more application links into the transcript of the message exchange thread, such as a link to a weather app that is already preloaded with San Francisco weather.

To determine which selectable application links are to be incorporated into transcripts of the message exchange thread that are displayed on client devices 106, one or more message exchange clients 107, and/or message exchange engine 120 or application engine 122, may identify one or more candidate applications that are installed on each client device 106 operated by a participant in the message exchange thread. In various implementations, the one or more identified candidate applications may be associated with content of the message exchange thread. In some implementations, the one or more cues discussed above may be associated with one or more applications.

As one example, if the participants are discussing music and/or musicians, the one or more candidate applications may be applications associated with playing, recording, and or producing music. If the participants are discussing movies, television, and/or actors/directors, then the one or more candidate applications may be associated with playing movies/television, or with searchable databases of cast/crew associated with movie and television productions. If the participants are discussing travelling, then the one or more candidate applications may be associated with making travel reservations for hotels, airlines, trains, boats, rental cars, etc. If the participants are discussing restaurants, the one or more candidate applications may be associated with making restaurant reservations, restaurant reviews, calling restaurants, and so forth.

Once the one or more candidate applications are identified, one or more selectable application links (also referred to as "selectable links") may be incorporated into a transcript of the message exchange thread that is displayed in a graphical user interface of a message exchange client 107 operating on a given client computing device 106. In various implementations, each selectable link may be operable by a message exchange thread participant to cause the corresponding client device 106 to expose to the participant an interface associated with a respective candidate application. For example, if a respective candidate application is running in the background (e.g., already loaded in some form into volatile memory), then operation of the corresponding selectable link may cause the candidate application to be made active so that the participant is exposed to, and hence can interact with, an interface (graphical, audible, haptic, etc.) of the respective candidate application. If a respective is installed but not running in the background, then operation of the corresponding selectable link may cause the candidate application to be opened or "launched," e.g., from nonvolatile memory.

Selectable application links may be incorporated into a message exchange thread between multiple message exchange clients 107 in a variety of ways. In some implementations, message exchange engine 120 may request that at least one message exchange client 107 participating in the message exchange thread insert one or more selectable application links into a transcript of the ongoing message exchange thread that is displayed in a graphical user interface. In some scenarios, the selectable graphical links may be incorporated into transcripts rendered by more than one message exchange client 107, such as in transcripts rendered by all message exchange clients 107 participating in the message exchange thread.

Selectable application links that are incorporated into a message exchange thread (and hence, into a transcript of the thread displayed by at least one message exchange client 107) may come in various forms. In some implementations, a selectable application link may come in the form of a graphical icon or animation associated with the linked-to application. In some implementations, the selectable application link may include text that conveys information about the application, or an action that can be taken using the application (e.g., "get directions to location"). In various implementations, the selectable link may be rendered as part of the transcript just like any other message of the message exchange thread. As such, the selectable application link may "move up" as additional messages are appended to the message exchange thread.

In some implementations, knowledge system 102 may have, e.g., as part of information engine 130 and/or another component, a so-called knowledge base that contains records of known entities (e.g., people, places, things) and relationships between the known entities. In some implementations, such a knowledge base may be implemented, e.g., in index 132, as a graph in which nodes represent entities and edges represent relationships between entities, although this is not required. In some such implementations, information about entities from such a knowledge base may be made available to components such as message exchange engine 120 and/or one or more message exchange clients 107. Those components may then use the entity information to identify relevant applications, prepopulate one or more input fields or other data points usable to transition between different states of a state machine associated with the identified candidate applications, and so forth.

In some implementations, the knowledge base may be used, e.g., by one or more of engines 120, 122, 126, and/or 130, to identify a first entity mentioned in one or more messages exchanged between the two or more users as part of the message exchange thread. Information related to the entity that is obtained, for instance, in response to a search query about the entity, may then be used to identify one or more candidate applications. For example, suppose a user submits into the message exchange thread a message such as "Babe Ruth was the greatest!" "Babe Ruth" may be identified, e.g., by information engine 130 based on a knowledge base stored in index 132, along with one or more attributes of Babe Ruth, and/or one or more related entities, such as one or more teams he played for (e.g., the New York Yankees), his family members, his teammates, years active, years alive, and so forth. One or more pieces of this information may then be used to identify one or more candidate applications or applications "categories" that may be responsive or otherwise relevant to the mention of the entity. In some implementations, pieces of this information may be used to "prepopulate" one or more data points (e.g., input parameters, data entry fields, data points that cause transition between states of a state machine, etc.) associated with a linked-to application. That way, when the user actuates a selectable application link, the linked-to application may open in a state in which the one or more data points are already populated.

Figure 2:
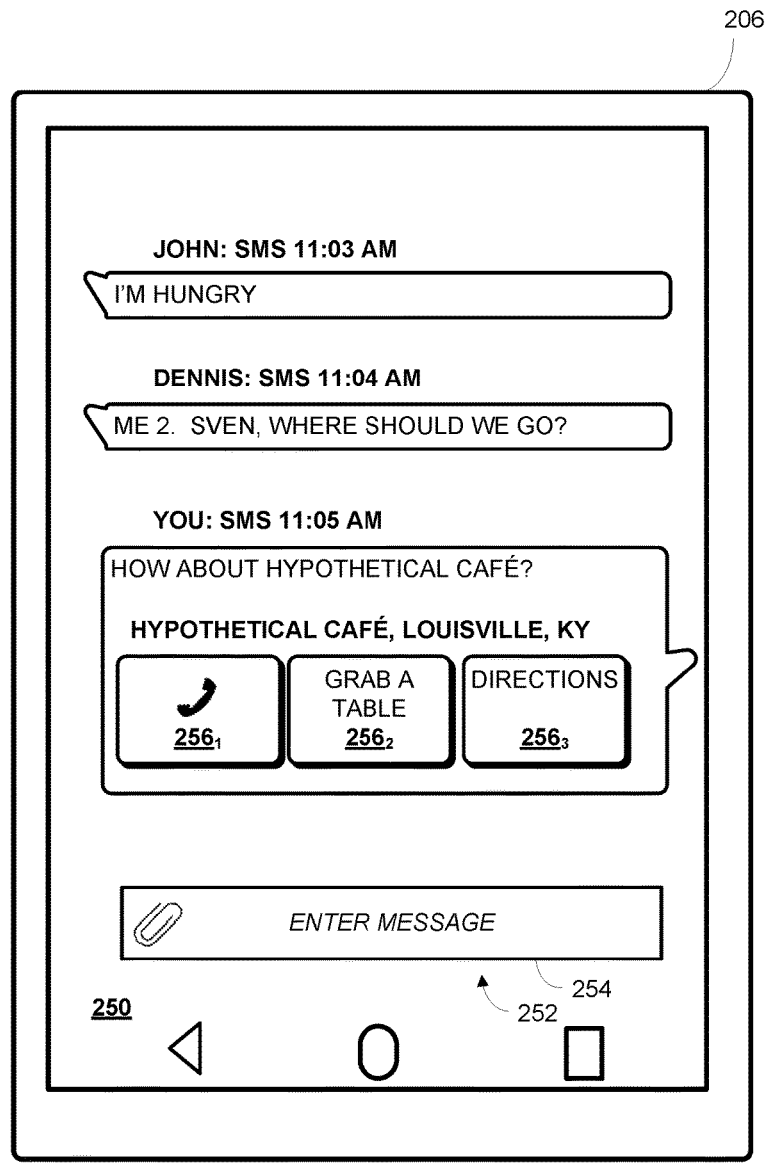
FIG. 2 and FIG. 3 depict examples of how client devices may render a graphical user interface for a message exchange client, in accordance with various implementations.

FIG. 2 depicts an example client device 206 operated by a user named Sven. Client device 206 includes a graphical user interface 250 associated with a message exchange client (not depicted specifically in FIG. 2) that operates on client device 206. Graphical user interface 250 displays a transcript 252 of a message exchange thread between Sven and two other users, John and Dennis. Graphical user interface 250 also includes a text input field 254 that Sven can use to input text or other content into the message exchange thread, e.g., in response to previous statements by the other two. In this example, John has stated that he is hungry. Dennis agreed and posed the question to Sven, "where should we go?" Sven ("You" in FIG. 2 because this is Sven's client device 206) responded by proposing a restaurant called "Hypothetical Café."

At this point in the conversation, the questions/statements posed by John and Dennis, as well as the suggestion from Sven, may lead to a plurality of selectable application links $256_{1-3}$ to be rendered in the transcript 252. First selectable application link $256_1$ links to a telephone application. If Sven selects this link, an interface of a telephone app installed on client device 206 may be exposed to Sven. For example, the telephone app may be launched, and/or the telephone app may be provided the active window (which in many mobile devices is a single window). In some implementations, the telephone app may be pre-dialed to call a telephone number associated with Hypothetical Café. A third selectable application link $256_3$ links to a mapping application, e.g., with directions to Hypothetical Café preloaded.

Second selectable link $256_2$ links to a "GRAB A TABLE" application that is operable by a participant to make a reservation at Hypothetical Café. If Sven or another participant selects that link, an interface (e.g., a graphical, interactive voice response, haptic, etc.) associated with the "GRAB A TABLE" application may be exposed to Sven and/or to the other participant that selected the link. In some implementations, the "GRAB A TABLE" app may have various data points such as inputs prepopulated with data obtained from various sources.

In some implementations, the data points may be prepopulated with contextual data associated with one or more participants of the message exchange thread. Contextual data associated with the one or more message exchange thread participants may come from a variety of sources, such as from information signals emanating from the content of the message exchange thread (e.g., a user mentions being not hungry, and hence may not be counted as a potential attendee) or from client devices operated by the various participants. For example, global positioning system ("GPS") coordinates provided by a client device operated by a particular participant may reveal that the particular participant is located too far away from Hypothetical Café to feasibly attend lunch at that location in a half hour. That participant may not be included in the number of diners. The same might be true if a particular participant indicates in the message exchange thread that he or she cannot attend, does not like the menu, etc.

In FIG. 2, the selectable links $256_{1-3}$ are rendered within a "bubble" that represents a message incorporated into the thread by Sven. However, this is not meant to be limiting. In various implementations, selectable application links may be rendered elsewhere in a transcript, e.g., as standalone links that are not part of any participant's bubble. In some implementations, when selectable links are rendered with bubbles, they may simply be presented as text, e.g., purporting to be from a personal assistant module involved in the message exchange thread.

Figure 3:
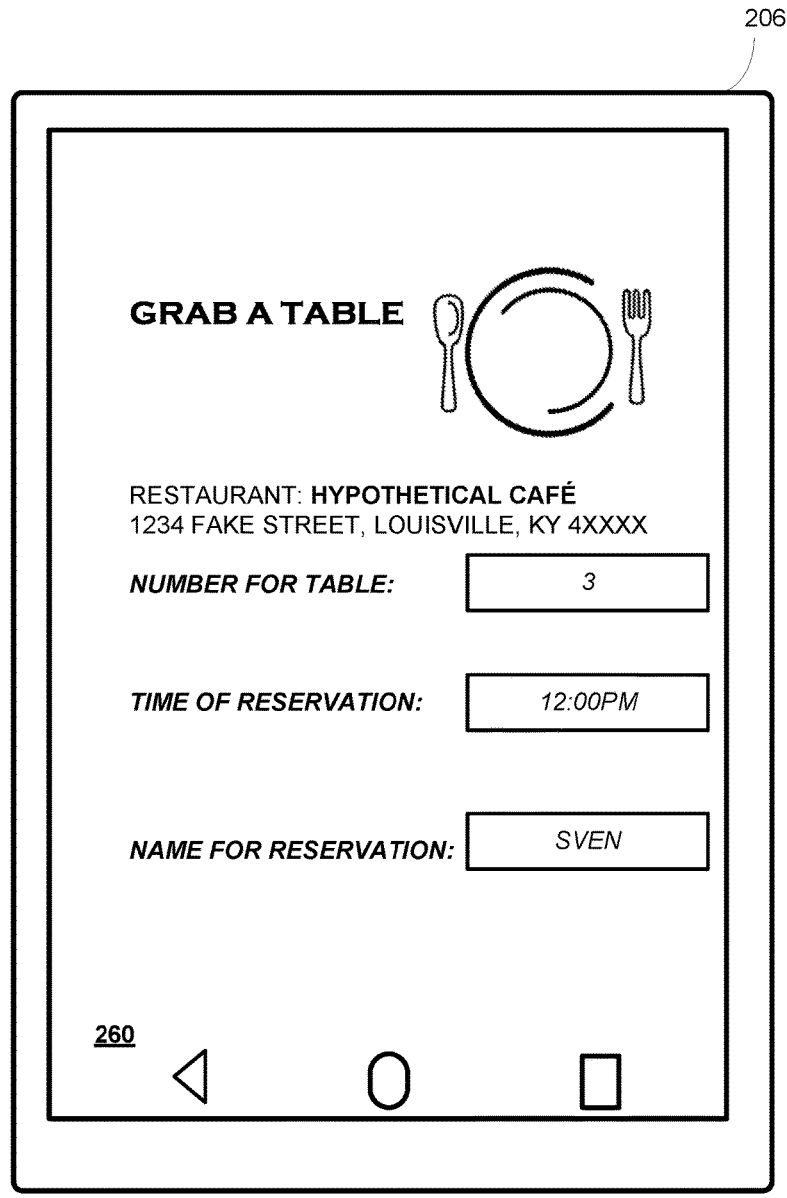

An example of an interface 260 associated with a "GRAB A TABLE" application (which is merely a hypothetical application described herein for demonstrative purposes) that may be exposed to Sven in response to Sven operating selectable application link $256_2$ is depicted in FIG. 3. In this example, the "GRAB A TABLE" interface 260 has been rendered on Sven's client device 206 with various data points (e.g., input fields) prepopulated. For example, because there were three participants (John, Dennis, Sven) in the message exchange thread, and because no information signals associated with the content of the thread or the individual participants suggest that any of them will not attend lunch, the reservation has been queued up for three diners.

The time of reservation has been prepopulated with 12:00 PM. This may be because, for instance, the participants would need sufficient time to reach the restaurant after exchanging the messages discussing lunch (which were exchanged at 11:03 AM, 11:04 AM, and 11:05 AM). The time of the reservation additionally or alternatively may have been prepopulated with 12:00 PM because that is next time of day people commonly have a meal. Had the participants been discussing eating at, say, 3:30 PM, then the time for the reservation may have been prepopulated with a time more commonly associated with dinner, such as 6:30 PM. The name of the reservation is "SVEN" because Sven was the participant that selected one of the selectable application links in FIG. 2. However, had similar links been presented to John and/or Dennis on their own client devices, and had either of them operated the selectable application link, then the reservation may have been prepopulated with their names instead.

Figure 4:
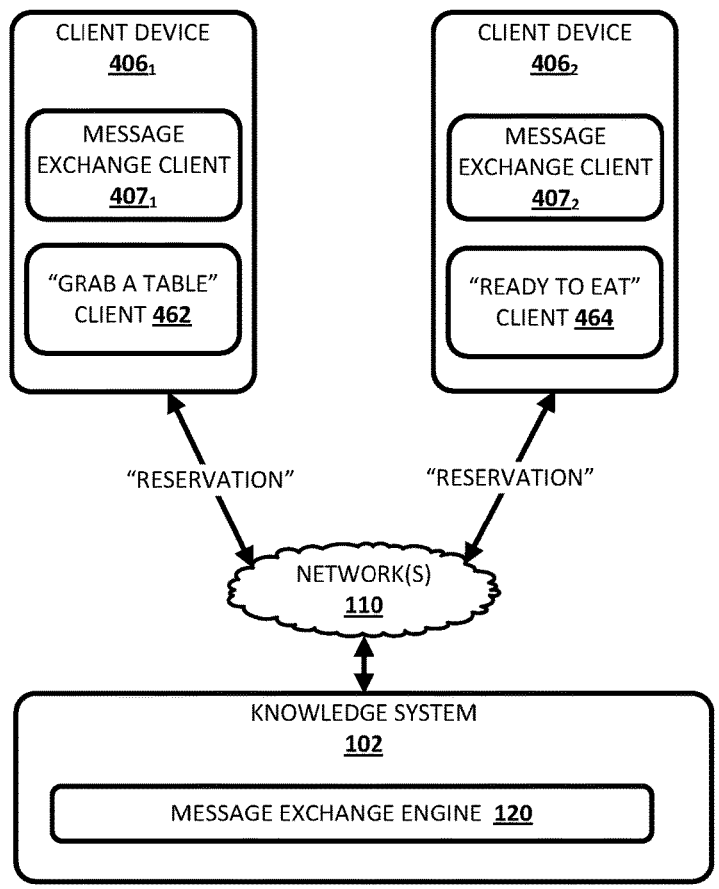
FIG. 4 depicts one example of how individual client devices may identify candidate applications that are installed locally, in accordance with various implementations.

As noted above, one or more selectable application links may be selectively rendered in a transcript displayed by a client device based at least in part on resources available on the client device. For example, in some implementations, only selectable application links to installed applications may be displayed on a client device. FIG. 4 depicts various components of the environment depicted in FIG. 1 and demonstrates how one or more components that is integral with (e.g., software installed on, a hardware component of) a client device 406 may perform the identification of applications installed on the client device 406. In this example, first client device $406_1$ has installed, among other things, the (hypothetical) reservation client application 462 called "GRAB A TABLE" that was discussed previously. Second client device $406_2$ has installed, among other things, a different (hypothetical) reservation client application 464 called "READY TO EAT."

Suppose a first message exchange client $407_1$ operating on a first client device $406_1$ is being operated to participate in a message exchange thread that also involves a second message exchange client $407_2$ operating on a second client device $406_2$. Suppose further that the message exchange thread currently includes a discussion about where to eat, similar to FIG. 3. Based on this discussion (i.e., on one or more cues from the discussion that relate to making a restaurant reservation), an application category of "RESERVATION" has been identified, e.g., by message exchange engine 120, and an indication of this category has been provided to client devices $406_1$ and $406_2$.

Once message exchange clients $407_{1-2}$ receive the indication of the "RESERVATION" application category, each can identify one or more locally-installed applications that match the "RESERVATION" category. For example, first client device $406_1$ has the "GRAB A TABLE" client 462 installed, which first message exchange client $407_1$ may identify as a "RESERVATION" application. Consequently, first message exchange client $407_1$ may incorporate, into a transcript of the message exchange thread it displays, a selectable application link to the "GRAB A TABLE" client 462. Likewise, second client device $406_2$ has the "READY TO EAT" client 464 installed, which second message exchange client $407_2$ may identify as a "RESERVATION" application. Consequently, second message exchange client $407_2$ may incorporate, into a transcript of the message exchange thread it displays, a selectable application link to the "READY TO EAT" client 464.

In some implementations, a client device may have multiple applications installed that match a particular application category. For example, a single client device may have both the "GRAB A TABLE" client 462 and the "READY TO EAT" client 464 depicted in FIG. 4. In some implementations, selectable application links to both applications may be incorporated into the message exchange thread transcript on that client device. In some versions, the multiple selectable application links may be presented in an order that is selected based on a variety of information signals, such as frequency of use of each client. If "GRAB A TABLE" client 462 is used more frequently than "READY TO EAT" client 464, a selectable application link to client 462 may be presented first, more prominently, more conspicuously, etc., than a selectable application link to client 464.

In some implementations in which multiple applications installed on a single client device match an application category, a message exchange client 407 or other component may analyze how frequently those multiple applications are used to determine whether each warrants incorporation of a selectable application link into a transcript of a message exchange thread. For example, a frequency of use associated with a given application may need to satisfy a predetermined threshold, in isolation or relative to other matching installed applications, in order to have a corresponding selectable application link incorporated into message exchange thread transcripts. If the application is not used frequently, or even at all (e.g., if the application was installed by the equipment manufacturer and never opened by the user), then no selectable application link to the application may be incorporated into transcripts of message exchange threads.

Figure 5:
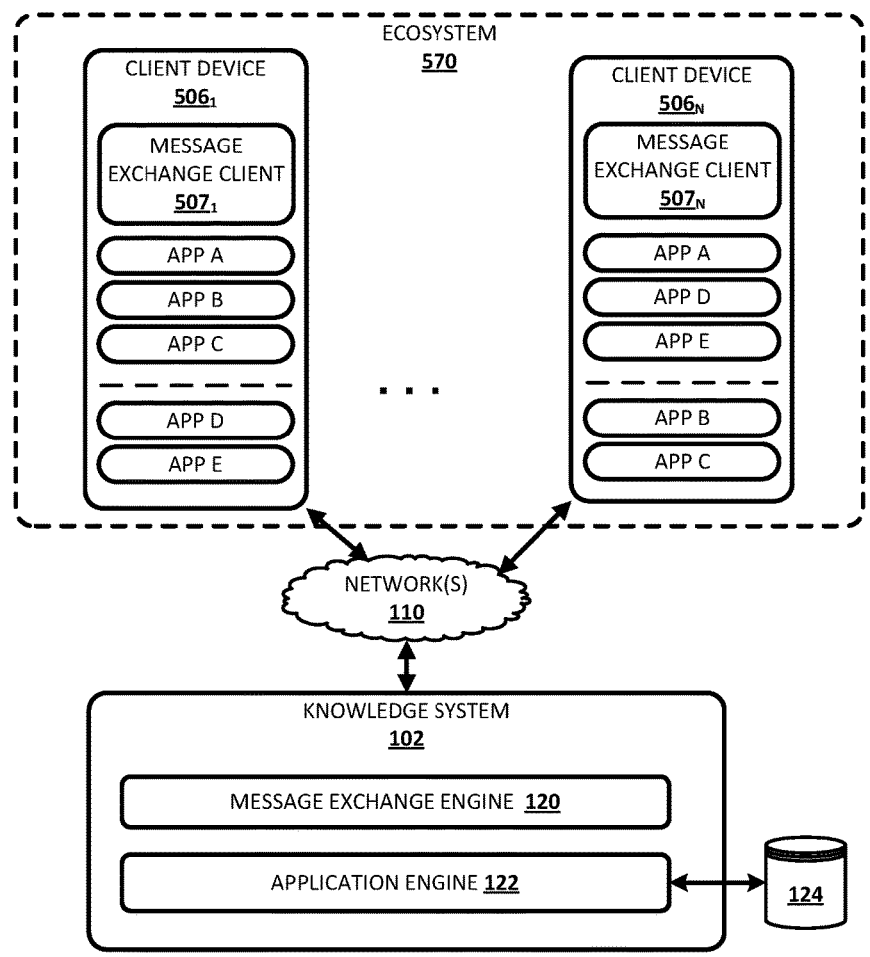
FIG. 5 depicts one example of how candidate applications that are installed on individual client devices may be identified remotely, in accordance with various implementations.

FIG. 5 depicts an alternative scenario to FIG. 4. Here, identification of installed applications on client devices $506_{1-N}$ of a coordinated ecosystem 570 operated by a participant may be performed at least in part remotely from the client devices $506_{1-N}$. In particular, application engine 122 (which was described above and may be integral with, or at least in communication with, an app store) may be configured to determine, based on records in index 124, what applications are installed on which client devices 506 of ecosystem 570.

Suppose for this example that the user/participant that operates client devices $506_{1-N}$ of ecosystem 570 owns the rights to download and use applications APP A, APP B, APP C, APP D, and APP E. On a first client device $506_1$, which may be, for instance, the user's mobile phone, the user has installed APP A, APP B, and APP C. APP D and APP E are not installed on first client device $506_1$, as indicated by their placement below the line, but they may be available for download and/or installation because the user has previously purchased the right to do so. On a second client device $506_N$, which may be, for instance, the user's smart watch, the user has installed APP A, APP D, and APP E. APP B and APP C are not installed on second client device $506_N$, as indicated by their placement below the line, but they may be available for download and/or installation because the user has previously purchased the right to do so.

In the example of FIG. 5, message exchange engine 120 may consult with application engine 122 in order to determine which applications are installed on which client devices 506. When one or more cues to incorporate one or more selectable application links into a message exchange thread are detected, message exchange engine 120 may request that application engine 122 identify one or more applications installed on the given client device 506. Message exchange engine 120 may then be configured to download, to the given client device 506, data indicative of one or more selectable application links to applications installed on the given client device that are also associated with content of the message exchange thread. In various implementations, the given client device 506 may automatically incorporate the one or more selectable application links into a message exchange thread transcript, or it may selectively incorporate into the transcript a subset of the one or more selectable application links in response to one or more signals (e.g., frequency of use of the linked-to application, whether the linked-to application is still installed, etc.). In some implementations, if a given application is not installed but available to a client device (as is the case with APP D and APP E on first client device $506_1$), then an application link that is selectable to fully install the application onto the client device 506 may be incorporated into a transcript of the message exchange thread displayed on that client device.

The above-described examples demonstrated how selectable application links may link to specific applications. However, this is not meant to be limiting. In some implementations, selectable application links may link to documents or other online content that is relevant to the discussion and that is accessible using any number of applications. For example, in some implementations, a selectable application link may link to a web address or other online identifier. In some such implementations, operation of the selectable application link at a client device may expose a favorite installed web browser to the user. In various implementations, the web browser may have already loaded a web page or other content that is relevant to the content of the message exchange thread, such as an interactive web page with functionality that corresponds to that of an application that is not installed on the client device.

Figure 6:
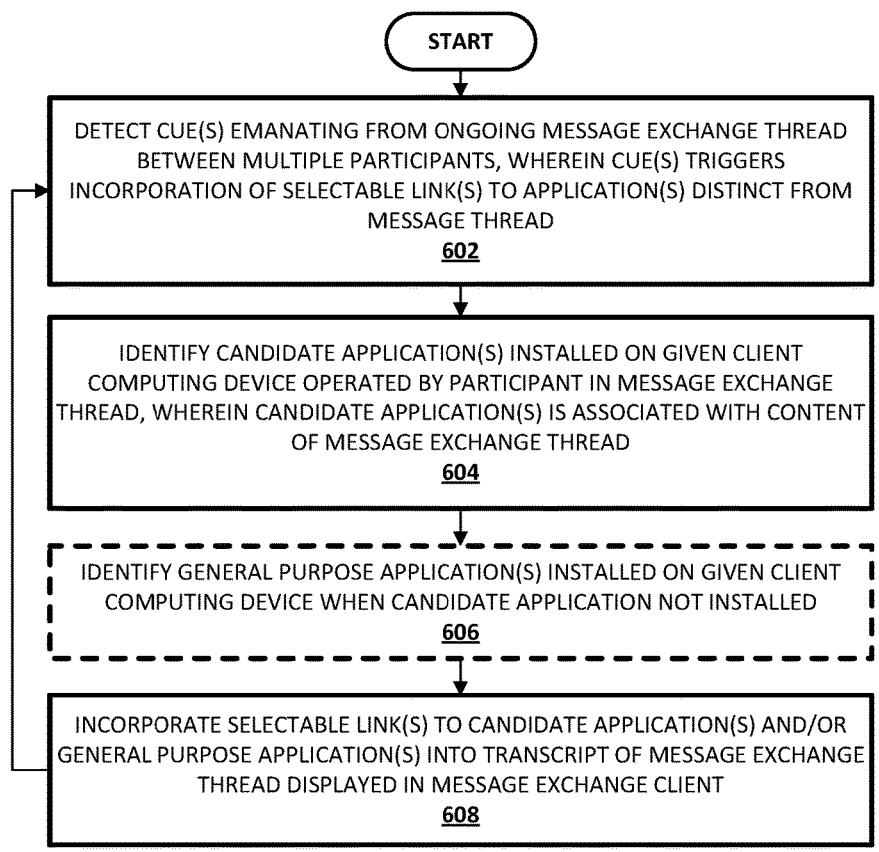
FIG. 6 depicts a flow chart illustrating an example method of incorporating, into a transcript of a message exchange thread, selectable application links to one or more applications associated with content of the message exchange thread, in accordance with various implementations.

Referring now to FIG. 6, one example method 600 of selectively incorporating selectable application links into a message exchange thread with multiple participants is described. For convenience, the operations of the flow chart are described with reference to a system that performs the operations. This system may include various components of various computer systems, including various engines and/or client applications described herein. Moreover, while operations of method 600 are shown in a particular order, this is not meant to be limiting. One or more operations may be reordered, omitted or added.

At block 602, the system may detect one or more cues emanating from an ongoing message exchange thread, e.g., between multiple participants operating multiple client devices. Detection of the one or more cues may trigger incorporation into the message exchange thread of one or more selectable links to applications that are distinct from the message exchange thread. Examples of non-message-exchange-related applications were described previously.

At block 604, the system may identify one or more candidate applications installed on a given client device operated by a participant in the message exchange thread. As described above, in some implementations, the candidate applications may be those that are deemed somehow relevant to content of the message exchange thread. FIGS. 2-3 depict one example in which message exchange thread participants are discussing dining out, and as a consequence, applications that are associated with dining out (e.g., a phone dialer to call a restaurant, a reservation application, a map application, etc.) are identified. Other examples are also described above. In some implementations, the identifying of block 604 may be performed one or more of the processors that is remote from a given client computing device, and data indicative of the one or more selectable links may be downloaded to the given client device. In other implementations, the identifying of block 604 may be performed by one or more of the processors that is integral with the given client computing device.

In some scenarios, one or more candidate applications most suitable for incorporation may not be installed on the given client computing device. However, some candidate applications (e.g., restaurant/airline reservation applications, mapping applications, etc.) may have corresponding webpages that include corresponding functionality. For instance, a user could navigate a web browser to the "GRAB A TABLE" website and make a reservation much in the same way as a user could make a reservation using the "GRAB A TABLE" app. Accordingly, in some implementations, at optional block 606, the system may identify, as a candidate application, a web browser or other general-purpose application installed on the given client computing device in response to a determination that a given application associated with content of the message exchange thread is not installed on the given client computing device.

At block 608, the system may incorporate one or more selectable application links into a transcript of the message exchange thread that is rendered by one or more message exchange clients operating on one or more client devices. As noted above, in some implementations, selectable links may be visible only to the user that made a statement in the message exchange thread that triggered incorporation of the links. In other implementations, if one user makes a statement that triggers incorporation of selectable application links into the message exchange thread, multiple participants of the message exchange, including but not limited to all participants, may have a selectable link incorporated into their respective transcripts. In instances in which a general purpose application such as a web browser is identified at block 606, in various implementations, the system may incorporate a selectable link to an interactive webpage that includes functionality that corresponds to functionality of the given application that was determined not to be installed on the given client computing device. Additionally or alternatively, in various implementations, the system may incorporate a selectable link to download and/or install the application that was determined not to be installed on the given client computing device.

Figure 7:
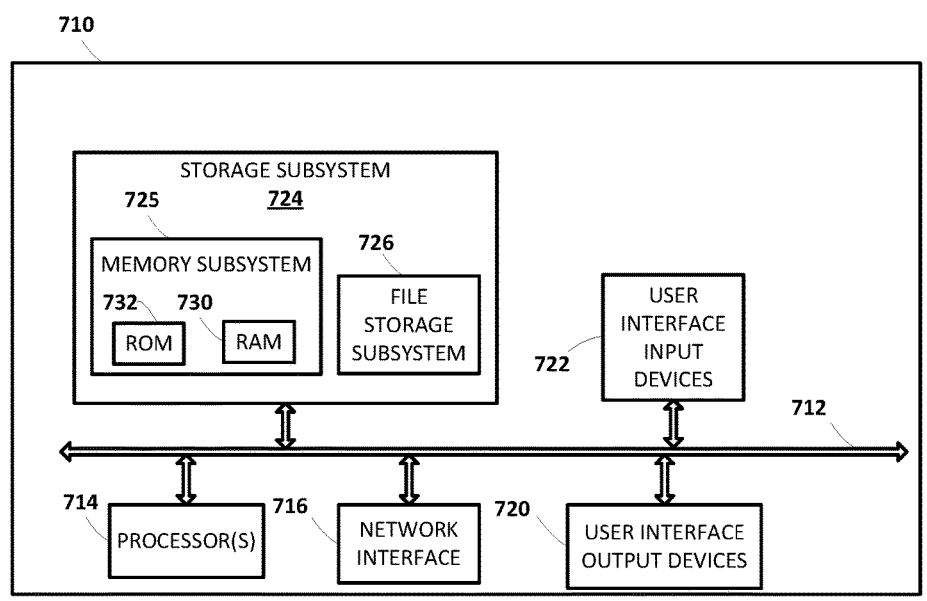
FIG. 7 schematically depicts an example architecture of a computer system.

FIG. 7 is a block diagram of an example computer system 710. Computer system 710 typically includes at least one processor 714 which communicates with a number of peripheral devices via bus subsystem 712. These peripheral devices may include a storage subsystem 726, including, for example, a memory subsystem 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 726 stores programming and data constructs that provide the functionality of some or all of the modules described herein. For example, the storage subsystem 726 may include the logic to perform selected aspects of method 600, and/or to implement one or more of message exchange client 107, message exchange engine 120, application engine 122, indexing engine 126, information engine 130, ranking engine 134, and/or alternative query suggestion engine 136.

These software modules are generally executed by processor 714 alone or in combination with other processors. Memory 725 used in the storage subsystem 726 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 726, or in other machines accessible by the processor(s) 714.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
   detecting, by one or more processors, one or more cues emanating from a message exchange thread involving two or more message exchange software clients;
   identifying, by one or more of the processors, an application category associated with the one or more cues;
   selecting, by one or more of the processors based on the application category, from a plurality of software applications that are distinct from the two or more message exchange clients and that are installed locally on a given client computing device operated by a participant in the message exchange thread, one or more candidate software applications that match the application category; and
   incorporating, by one or more of the processors, into a transcript of the message exchange thread that is displayed in a graphical user interface of a message exchange software client operating on the given client computing device, one or more selectable links, wherein each selectable link is operable by the participant to cause the given client computing device to expose to the participant an interface associated with a respective candidate software application of the one or more candidate software applications that match the application category.

2. The computer-implemented method of claim 1, wherein the selecting is performed by one or more of the processors that is remote from the given client computing device, and data indicative of the one or more selectable links is downloaded to the given client device.

3. The computer-implemented method of claim 2, further comprising selecting, by one or more processors of the given client device, a subset of the downloaded one or more selectable links for display based on one or more information signals.

4. The computer-implemented method of claim 3, wherein the one or more information signals comprise a frequency of use of the one or more candidate software applications.

5. The computer-implemented method of claim 1, wherein the selecting is performed by one or more of the processors that is integral with the given client computing device.

6. The computer-implemented method of claim 1, wherein the one or more cues emanate from the content of the message exchange thread.

7. The computer-implemented method of claim 6, wherein the one or more cues include a keyword or key phrase associated with a particular candidate software application.

8. The computer-implemented method of claim 6, wherein the one or more cues include a statement directed from one participant of the message exchange thread to another participant that matches a pattern associated with a particular candidate software application.

9. The computer-implemented method of claim 8, wherein the one or more cues include a match between the statement and a template associated with the particular candidate software application, wherein the template is generated from a corpus of messages that includes messages from prior message exchange threads, and wherein the template is associated with a cluster of messages from the corpus that share one or more attributes.

10. The computer-implemented method of claim 1, wherein the identifying comprises identifying, as a candidate software application, a web browser installed on the given client computing device in response to a determination that a given software application associated with content of the message exchange thread is not installed on the given client computing device; and
    wherein the incorporating comprises incorporating, into the transcript, a selectable link to an interactive webpage, wherein the interactive webpage includes functionality that corresponds to functionality of the given software application that is not installed on the given client computing device.

11. The computer-implemented method of claim 1, wherein the identifying comprises identifying, as a candidate software application, a web browser installed on the given client computing device in response to a determination that a given software application associated with content of the message exchange thread is not installed on the given client computing device; and
    wherein the incorporating comprises incorporating, into the transcript, a selectable link to a webpage associated with downloading an installer of the given software application.

12. The computer-implemented method of claim 1, further comprising:
    determining, by one or more of the processors, a context of one or more participants in the message exchange thread; and
    prepopulating one or more data points associated with at least one of the one or more candidate software applications based on the determined context.

13. The computer-implemented method of claim 12, wherein determining the context comprises obtaining, from one or more of the client devices, one or more contextual signals.

14. The computer-implemented method of claim 13, wherein the one or more contextual signals comprises a location of at least one participant in the message exchange thread.

15. The computer-implemented method of claim 1, wherein the one or more cues comprise mention of an entity.

16. The computer-implemented method of claim 15, further comprising matching the mentioned entity with one or more known entities in a knowledge base of entities and relationships therebetween.

17. A system comprising one or more processors and one or more memories operably coupled with the one or more processors, wherein the one or more memories store instructions that, in response to execution of the instructions by one or more processors, cause the one or more processors to:
    detect one or more cues emanating from a message exchange thread involving two or more message exchange clients;
    identify an application category associated with the one or more cues;
    select, based on the application category, from a plurality of software applications that are distinct from the two or more message exchange clients and that are installed locally on a given client computing device operated by a participant in the message exchange thread, one or more candidate software applications that that match the application category; and
    incorporate into a transcript of the message exchange thread that is displayed in a graphical user interface of a message exchange client operating on the given client computing device, one or more selectable links, wherein each selectable link is operable by the participant to cause the given client computing device to expose to the participant an interface associated with a respective candidate software application of the one or more candidate software applications that match the application category.

18. The system of claim 17, wherein the selection is performed by one or more of the processors that is remote from the given client computing device, and data indicative of the one or more selectable links is downloaded to the given client device, and the system further comprises instructions to select a subset of the downloaded one or more selectable links for display based on one or more information signals.

19. At least one non-transitory computer-readable medium comprising instructions that, in response to execution of the instructions by one or more processors, cause the one or more processors to perform the following operations:

detecting one or more cues emanating from a message exchange thread involving two or more message exchange software clients;

identifying, by one or more of the processors, an application category associated with the one or more cues;

selecting, based on the application category, from a plurality of software applications that are distinct from the two or more message exchange clients and that are installed locally on a given client computing device operated by a participant in the message exchange thread, one or more candidate software applications that match the application category; and incorporating into a transcript of the message exchange thread that is displayed in a graphical user interface of a message exchange software client operating on the given client computing device, one or more selectable links, wherein each selectable link is operable by the participant to cause the given client computing device to expose to the participant an interface associated with a respective candidate software application of the one or more candidate software applications that match the application category.

* * * * *